(12) United States Patent
Murphy

(10) Patent No.: US 11,909,083 B2
(45) Date of Patent: Feb. 20, 2024

(54) APPARATUS AND METHOD FOR FORMING A MULTILAYER EXTRUSION COMPRISING COMPONENT LAYERS OF AN ELECTROCHEMICAL CELL

(71) Applicant: Palo Alto Research Center Incorporated, Palo Alto, CA (US)

(72) Inventor: Kathryn F. Murphy, San Francisco, CA (US)

(73) Assignee: XEROX CORPORATION, Norwalk, CT (US)

( * ) Notice: Subject to any disclaimer, the term of this patent is extended or adjusted under 35 U.S.C. 154(b) by 226 days.

(21) Appl. No.: 16/235,403

(22) Filed: Dec. 28, 2018

(65) Prior Publication Data

US 2020/0212466 A1    Jul. 2, 2020

(51) Int. Cl.
*H01M 8/1004* (2016.01)
*B01D 69/08* (2006.01)
(Continued)

(52) U.S. Cl.
CPC ........ *H01M 8/1004* (2013.01); *B01D 69/088* (2013.01); *B01D 69/1214* (2022.08); *H01M 8/1086* (2013.01)

(58) Field of Classification Search
CPC ............. H01M 4/8864; H01M 4/0411; H01M 4/8642; H01M 4/8875; H01M 8/1069;
(Continued)

(56) References Cited

U.S. PATENT DOCUMENTS

| | | | | |
|---|---|---|---|---|
| 2,761,769 A | * | 9/1956 | Elder .................. | B01J 8/382 208/158 |
| 3,334,382 A | * | 8/1967 | Lefevre ............... | B29C 48/307 425/133.1 |

(Continued)

FOREIGN PATENT DOCUMENTS

WO    2006039464 A1    4/2006

OTHER PUBLICATIONS

Battelle Memorial Institute, "Manufacturing Cost Analysis of PEM Fuel Cell Systems for 5- and 10-kW Backup Power Applications", Oct. 2016, 124 pages.

(Continued)

*Primary Examiner* — Ryan S Cannon
(74) *Attorney, Agent, or Firm* — Mueting Raasch Group

(57) ABSTRACT

A co-extrusion die is configured to produce a multilayer extrusion comprising component layers of an electrochemical cell. The die comprises a plurality of inlet ports configured to receive a plurality of pressurized fluids comprising at least a first metallic ink, a second metallic ink, and a polymeric ink. A plurality of channels are configured to separately transport and shape the plurality of fluids from the plurality of inlet ports to a merge section, such that the plurality of fluids flow together in the merge section to form the multilayer extrusion comprising a polymeric membrane layer disposed between and in contact with a first metallic layer and a second metallic layer. A thickness of each layer within the merge section is controllable by adjustment of a pressure of the plurality of pressurized fluids. An outlet port is configured to output the multilayer extrusion onto a substrate.

22 Claims, 13 Drawing Sheets

(51) Int. Cl.
*H01M 8/1086* (2016.01)
*B01D 69/12* (2006.01)

(58) Field of Classification Search
CPC . B28B 3/26–269; B29C 48/307; B29C 48/18; B29C 48/21; B29C 48/255; B29C 48/495; B01D 69/1212; B01D 69/12; B01D 2323/60
USPC ...................................................... 425/133.5
See application file for complete search history.

(56) References Cited

U.S. PATENT DOCUMENTS

| | | | |
|---|---|---|---|
| 3,909,170 A * | 9/1975 | Riboulet | B29C 48/21 425/133.5 |
| 4,476,080 A * | 10/1984 | Komoda | B29C 48/21 156/244.11 |
| 4,917,851 A * | 4/1990 | Yamada | B29C 48/95 264/37.32 |
| 7,150,933 B1 | 12/2006 | McLean | |
| 7,504,174 B2 | 3/2009 | Lertola | |
| 7,569,082 B2 | 8/2009 | Valentine et al. | |
| 7,922,471 B2 | 4/2011 | Fork et al. | |
| 8,389,165 B2 | 3/2013 | Littau | |
| 8,574,790 B2 | 11/2013 | Sinha et al. | |
| 9,337,471 B2 | 5/2016 | Cobb | |
| 9,755,221 B2 | 9/2017 | Cobb | |
| 9,761,899 B2 | 9/2017 | Protsailo et al. | |
| 9,819,040 B2 | 11/2017 | Littau | |
| 9,855,578 B2 | 1/2018 | Cobb | |
| 2003/0118890 A1 | 6/2003 | Wittpahl et al. | |
| 2004/0159964 A1* | 8/2004 | Lavoie | B32B 37/153 264/40.1 |
| 2005/0255372 A1 | 11/2005 | Lertola | |
| 2006/0068253 A1 | 3/2006 | Henderson et al. | |
| 2007/0108229 A1* | 5/2007 | Fork | B29C 48/05 222/129 |
| 2007/0110836 A1* | 5/2007 | Fork | B29C 48/71 425/133.5 |
| 2008/0014495 A1 | 1/2008 | Saito et al. | |
| 2009/0074956 A1 | 3/2009 | Taylor | |
| 2010/0255407 A1 | 10/2010 | Kim et al. | |
| 2011/0272832 A1* | 11/2011 | Neavin | B29C 48/21 264/1.7 |
| 2012/0058414 A1 | 3/2012 | Cho et al. | |
| 2014/0186519 A1 | 7/2014 | Cobb | |
| 2014/0186698 A1 | 7/2014 | Cobb et al. | |
| 2016/0013512 A1 | 1/2016 | Bae et al. | |
| 2016/0226059 A1 | 8/2016 | Cobb | |
| 2017/0021537 A1* | 1/2017 | Kado | H01M 2/1673 |
| 2017/0312966 A1* | 11/2017 | Haindl | B29C 48/92 |

OTHER PUBLICATIONS

Chemours, "Product Bulletin P-14: Nafion D520/521, D1020/1021, D2020/2021", 2017, 2 pages.
James et al., "Final Report: Hydrogen Production Pathways Cost Analysis (2013-2016)", Sep. 30, 2016, pp. 1-55.
Lister et al., "PEM fuel cell electrodes", Journal of Power Sources 130, 2004, pp. 61-763.
Miller, "Slot Die Coating Technology", 2008 AIMCAL Fall Technical Conference, Oct. 19-22, 2008, 4 pages.
Nordson, "World's First 9-Manifold Extrusion Die is Up and Running, Yielding Multi-Layer Film with Two-Thirds Less Layer Thickness Variation", Sep. 23, 2015, 4 pages.
Schweiss et al., "White Paper SIGRACET® Gas Diffusion Layers for PEM Fuel Cells, Electrolyzers and Batteries", (2016).

* cited by examiner

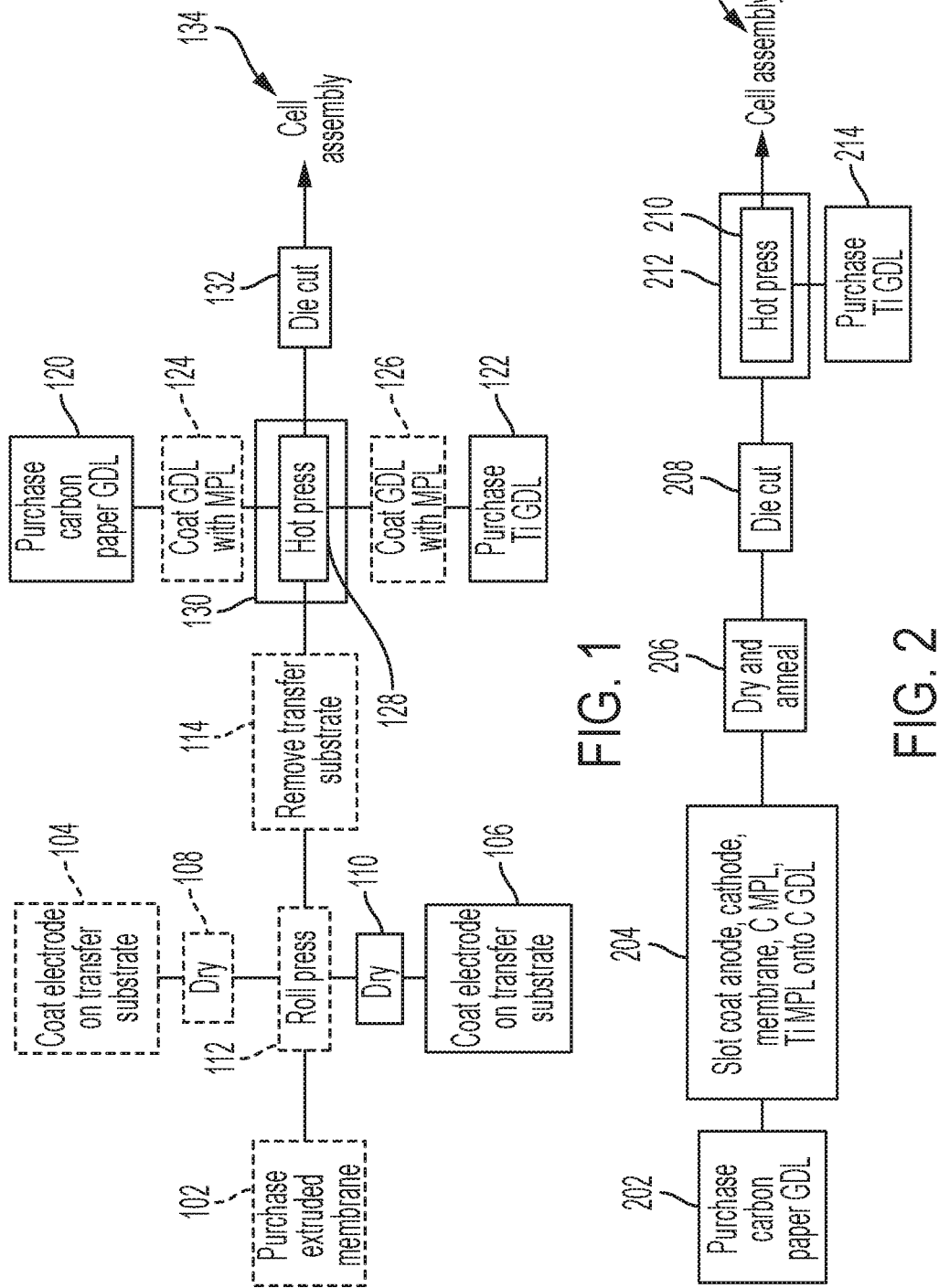

| Layer | Ink composition | Dry thickness | Wet thickness | Porosity |
|---|---|---|---|---|
| Membrane | Ionomer, propanol, water | 75-150 μm | 100-250 μm | 0% |
| Uniform electrodes | Pt/C or IrO₂ ionomer, propanol, water | 7-30 μm | 10-50 μm | 25-40% |
| Graded electrodes | Pt/C or IrO₂ ionomer, propanol, water | 15-45 μm total; 5-15 μm per sublayer | 25-70 μm | 25-40% |
| Microporous layers | C or Ti particles, PTFE binder, propanol, water | 30-50 μm | 45-75 μm | 30-60% |
| Cathode GDL | Carbon cloth or paper | 175-400 μm | n/a | 70-85% |
| Anode GDL | Ti impregnated cloth or paper | 175-400 μm | n/a | 70-85% |

FIG. 11

| Layer | Thickness (μm) | Porosity |
|---|---|---|
| Anode GDL | 280 | 0.76 |
| Baseline electrodes | 30 | 0.4 |
| Graded electrodes | 3 x 10 | 0.1, 0.4, 0.7 |
| Membrane | 150 | 0 |
| Cathode GDL | 280 | 0.78 |

FIG. 12

APPARATUS AND METHOD FOR FORMING A MULTILAYER EXTRUSION COMPRISING COMPONENT LAYERS OF AN ELECTROCHEMICAL CELL

BACKGROUND

Current approaches to manufacturing electrochemical cells, such as electrolysis cells, fuel cells, and batteries, are expensive and require many manual, laborious steps. Larger-than-necessary quantities of expensive materials, such as platinum (Pt) and Nafion® for example, are used to accommodate some of these manufacturing processes. The high cost of electrolyzers, for example, is driven in large part by the high cost of membrane electrode assemblies (MEAs), which are made of expensive materials using a laborious process.

Traditional electrolyzer manufacturing, an example of which is shown in FIG. 1, requires multiple steps for each layer in the electrolysis cell. Traditional electrolyzer manufacturing begins with an extruded ionomer membrane 102, typically purchased from external suppliers. An anode 104 and a cathode 106 are separately coated or screen printed in patches onto transfer substrates (e.g., polyimide film). The coated substrates are dried 108, 110, heated, and pressed 112 onto the membranes. The transfer substrates are then removed 114 using a roll calender. Two gas diffusion layers (GDLs) 120, 122 are coated with a microporous layer (MPL) 124, 126 or purchased at higher cost from suppliers with the layer already applied, then hot pressed 128 onto the MEAs 130. The MEAs 130 with GDLs 120, 122 are individually die cut 132, then assembled with bipolar plates and gaskets to form a stack during cell assembly 134.

BRIEF SUMMARY

Embodiments of the disclosure are directed to a co-extrusion die configured to produce a multilayer extrusion comprising component layers of an electrochemical cell. The die comprises a plurality of inlet ports configured to receive a plurality of pressurized fluids comprising at least a first metallic ink, a second metallic ink, and a polymeric ink. A plurality of channels are configured to separately transport and shape the plurality of fluids from the plurality of inlet ports to a merge section, such that the plurality of fluids flow together in the merge section to form the multilayer extrusion comprising a polymeric membrane layer disposed between and in contact with a first metallic layer and a second metallic layer. A thickness of each layer within the merge section is controllable by adjustment of a pressure of the plurality of pressurized fluids. An outlet port is fluidically coupled to the merge section and configured to output the multilayer extrusion onto a substrate.

Embodiments of the disclosure are directed to a co-extrusion die configured to produce a multilayer extrusion comprising layers of an electrochemical cell. The die comprises a plurality of inlet ports configured to receive a plurality of pressurized fluids comprising at least a polymeric ink, a first microporous layer ink, a second microporous layer ink, a plurality of graded first electrode inks having different electrode material loading, and a plurality of graded second electrode inks having different electrode material loading. A plurality of channels are configured to separately transport and shape the plurality of fluids from the plurality of inlet ports to a merge section, such that the plurality of fluids flow together in the merge section to form the multilayer extrusion comprising, in order, a first microporous layer, a plurality of graded first electrode layers, a polymeric membrane layer, a plurality of graded second electrode layers, and a second microporous layer. A thickness of each layer within the merge section is controllable by adjustment of a pressure of the plurality of pressurized fluids. An outlet port is fluidically coupled to the merge section and configured to output the multilayer extrusion onto a substrate.

Embodiments of the disclosure are directed to a method of producing a multilayer extrusion comprising component layers of an electrochemical cell. The method comprises receiving, by a co-extrusion die, a plurality of pressurized fluids comprising at least a first metallic ink, a second metallic ink, and a polymeric ink. The method comprises separately transporting and shaping the plurality of fluids through the die to a merge section of the die, such that the plurality of fluids flow together in the merge section to form the multilayer extrusion comprising a polymeric membrane layer disposed between a first metallic layer and a second metallic layer. The method also comprises controlling a thickness of each layer within the merge section by adjusting a pressure of the plurality of pressurized fluids. The method further comprises outputting the multilayer extrusion from the die onto a substrate.

BRIEF DESCRIPTION OF THE DRAWINGS

FIG. 1 shows a traditional electrolyzer manufacturing process requiring multiple steps for each layer in the electrolysis cell;

FIG. 2 shows a representative manufacturing process for producing electrochemical cells, including an electrolysis cell, in accordance with various embodiments;

FIG. 11 is a table showing the composition and properties of different inks and layers of a multilayer extrusion comprising component layers of an electrochemical cell in accordance with various embodiments; and FIG. 12 is a table showing properties of different layers of a multilayer extrusion comprising component layers of an electrochemical cell in accordance with various embodiments The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Figure 3:
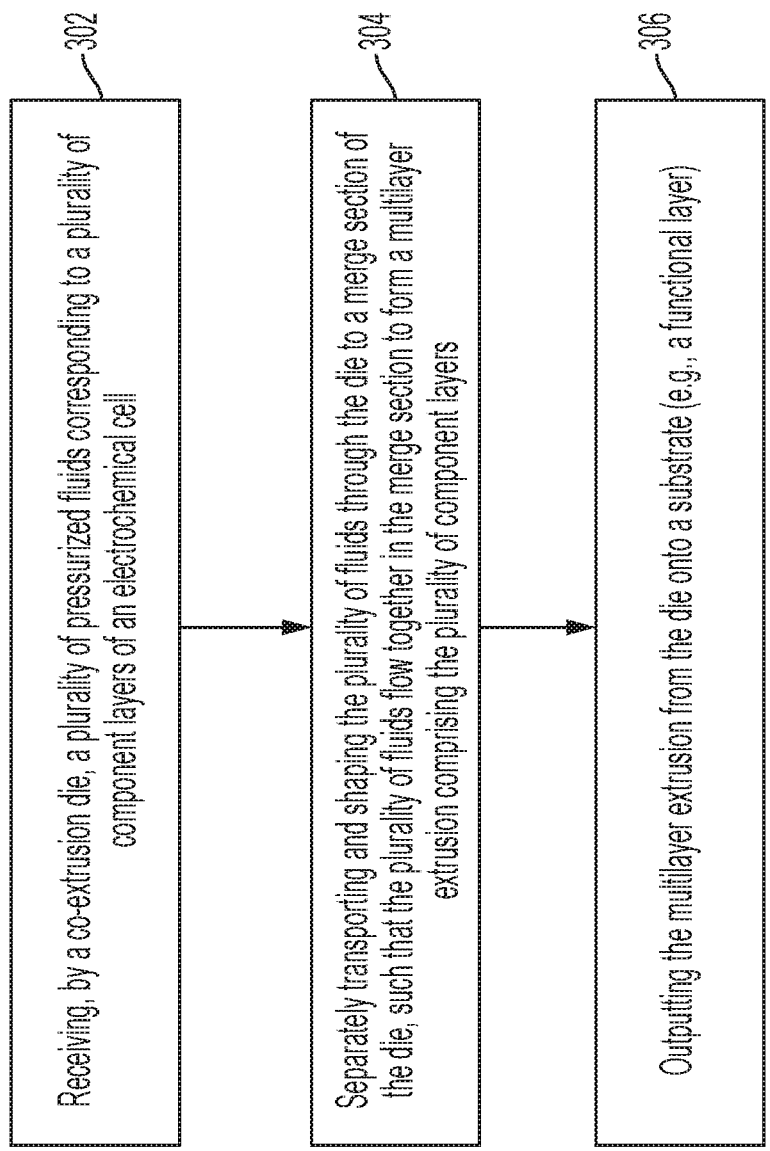
FIG. 3 illustrates a method of manufacturing component layers of an electrochemical cell in accordance with various embodiments.

Embodiments of the present disclosure are directed to apparatuses and methods for extruding a multilayer, multi-material structure comprising component layers of an electrochemical cell. Embodiments of the disclosure advantageously eliminate many of the processing steps of conventional electrochemical cell manufacturing approaches, and reduce the quantity of expensive materials needed to produce electrochemical cells. Embodiments of the disclosure streamline traditional approaches to manufacturing MEAs and other electrochemical cell structures for use in electrolyzers, fuel cells, and batteries.

For example, and with reference to FIG. 2, a representative manufacturing process for producing MEAs in accordance with various embodiments eliminates numerous steps of the traditional process shown in FIG. 1 and reduces equipment costs without sacrificing quality. In particular, the process steps of FIG. 1 shown in dashed boxes (boxes 102, 104, 108, 112, 114, 124, 126) can be a limited by implementing an MEA manufacturing process in accordance with various embodiments. Moreover, an MEA manufacturing approach of the present disclosure is fully compatible with current fuel cell and electrolyzer manufacturing practice.

According to the representative embodiment shown in FIG. 2, a method of manufacturing MEAs involves provision of a substrate 202, which is preferably a functional component of the MEA (e.g., a carbon paper GDL). The method involves using a co-extrusion die to slot coat 204 first MPL (e.g., titanium), anode, membrane, cathode, and second MPL (e.g., carbon) fluids onto the carbon paper GDL. This 5-layer MEA extrusion supported by the carbon paper GDL is subject to drying and annealing 206, followed by die cutting 208 to produce singulated MEAs 212. The method further involves provision of titanium impregnated GDLs 214 which are hot pressed 210 onto the singulated MEAs 212 supported by carbon GDLs to form 7-layer MEAs, which are subsequently incorporated in electrolyzer or fuel cells during cell assembly 216. It is estimated that the streamlined MEA manufacturing method shown in FIG. 2 can save 44% of MEA manufacturing cost, reducing stack cost by 11%, and system cost by 7%.

Some embodiments are directed to a roll-to-roll MEA manufacturing process which involves extruding membrane, catalyst layers, and microporous layers to produce a multi-layer structure deposited directly onto a GDL, as is shown in FIG. 2. This process reduces the number of MEA manufacturing steps from 10 to 4, eliminating the need for coating the anode and cathode separately on transfer substrates, hot pressing, and removing the substrates. Reducing the number of separate MEA manufacturing processes increases yield, and the conformal, low-stress interfaces between layers lead to longer lifetime. Some embodiments involve extrusion of MEAs with graded catalysts, which provides for reduced materials cost (e.g., reduced catalyst loading) and enhanced catalyst utilization. Removing the need for hot pressing of the electrodes and improving catalyst layer uniformity also reduces membrane cost by allowing for reduction in membrane thickness. Manufacturing processes of the present disclosure are scalable and compatible with existing electrolyzer, fuel cell, and battery manufacturing practices.

FIG. 3 illustrates a method of manufacturing component layers of an electrochemical cell in accordance with various embodiments. The method shown in FIG. 3 involves receiving 302, by a co-extrusion die, a plurality of fluids corresponding to a plurality of component layers of an electrochemical cell. The method involves separately transporting 304 the plurality of fluids through the die to a merge section of the die, such that the plurality of fluids flow together in the merge section to form a multilayer extrusion comprising a plurality of component layers. The method also involves outputting 306 the multilayer extrusion from the die onto a substrate, such as a functional layer of the electrochemical cell. The multilayer extrusion produced by the method of FIG. 3 can comprise component layers of an electrolysis cell, a fuel cell, or a battery.

Figure 4:
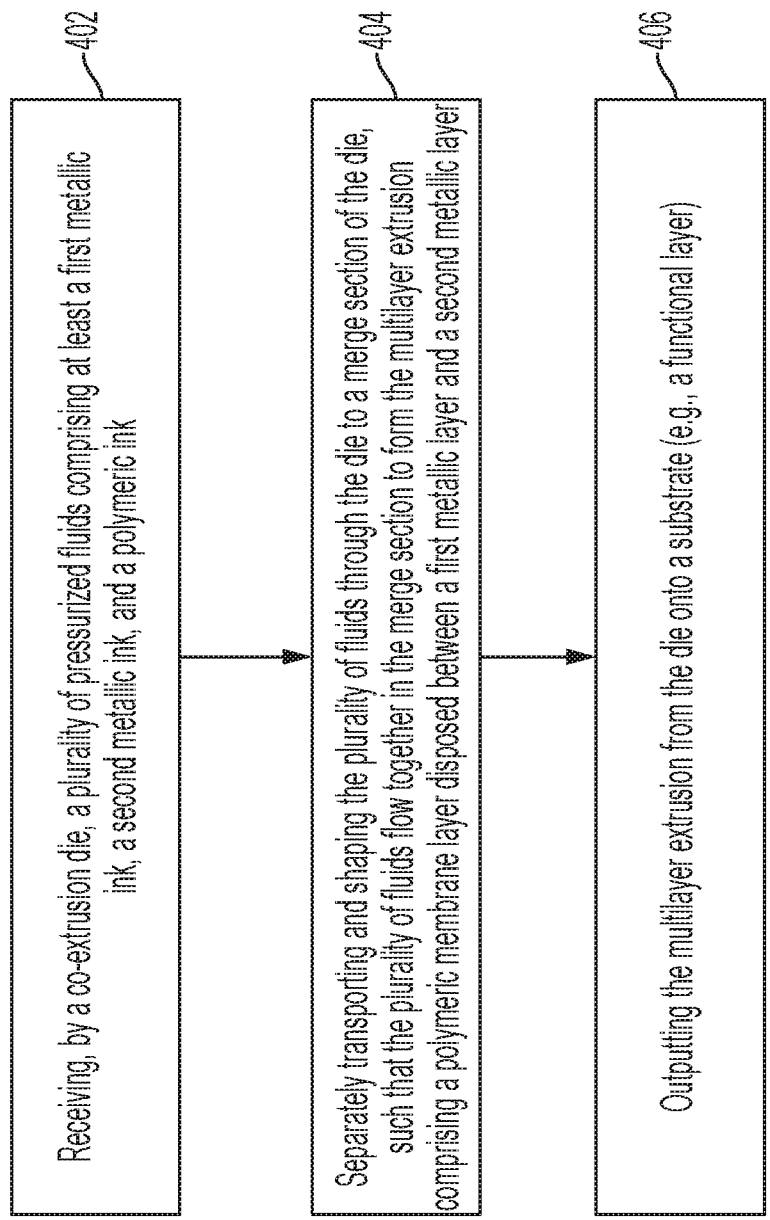
FIG. 4 illustrates a method of manufacturing component layers of an electrochemical cell in accordance with various embodiments.

FIG. 4 illustrates a method of manufacturing component layers of an electrochemical cell in accordance with various embodiments. The method shown in FIG. 4 involves receiving 402, by a co-extrusion die, a plurality of fluids comprising at least a first metallic ink, a second metallic ink, and a polymeric ink. The method involves separately transporting 404 the plurality of fluids through the die to a merge section of the die, such that the plurality of fluids flow together in the merge section to form the multilayer extrusion comprising a polymeric membrane layer disposed between a first metallic layer and a second metallic layer. The method also involves outputting 406 the multilayer extrusion from the die onto a substrate, such as a functional layer of the electrochemical cell.

According to some embodiments, the method shown in FIG. 4 can produce component layers of an electrolysis cell or a fuel cell, including a polymeric membrane (e.g., a proton exchange membrane or PEM) disposed between a first electrode (e.g., an anode) and a second electrode (e.g., a cathode). These component layers can be referred to as a 3-layer MEA. The 3-layer MEA can be output from the co-extrusion die to a substrate comprising a GDL. As will be discussed hereinbelow, a co-extrusion die of the present disclosure can be configured to produce an n-layer MEA structure (e.g., a 2-, 3-, 4-, 5-, 6-, 7-, 8- or 9-layer MEA structure) for incorporation in an electrolysis cell or a fuel cell.

According to other embodiments, the method shown in FIG. 4 can produce an multilayer structure comprising a polymeric membrane (e.g., PEM) disposed between a first metallic layer and a second metallic layer. The first and second metallic layers, in contact with the polymeric membrane, comprise, are made of, or have the characteristics of a metal such as platinum (Pt) or gold (Au). The thickness and continuity of coverage of the first and second metallic layers on the polymeric membrane are such that the metallic first and second layers have low hydrogen permeability as well as good catalytic properties, and effectively reduce the amount of hydrogen crossover at the membrane. The multilayer structure can also include first and second electrodes, such that the first metallic layer is disposed between the first electrode and the membrane, and the second metallic layer is disposed between the second electrode and the membrane. These 3-layer and 5-layer PEM and MEA embodiments and cell assemblies incorporating same can include various features disclosed in U.S. Published Patent Application No. 2006/0068253, which is incorporated herein by reference.

In accordance with further embodiments, the method shown in FIG. 4 can produce a multilayer battery structure, including a polymeric separator disposed between a first electrode (e.g., an anode) and a second electrode (e.g., a cathode). For example, a 3-layer structure (e.g., first electrode, polymeric separator, second electrode) can be output from the co-extrusion die to a substrate comprising a current collector (e.g., a metallic foil). A second current collector can be applied to this 4-layer battery structure to produce a 5-layer battery structure. These multilayer battery structures and assemblies incorporating same can include various features disclosed in commonly-owned U.S. Pat. No. 9,337,471, which is incorporated herein by reference.

Figure 5:
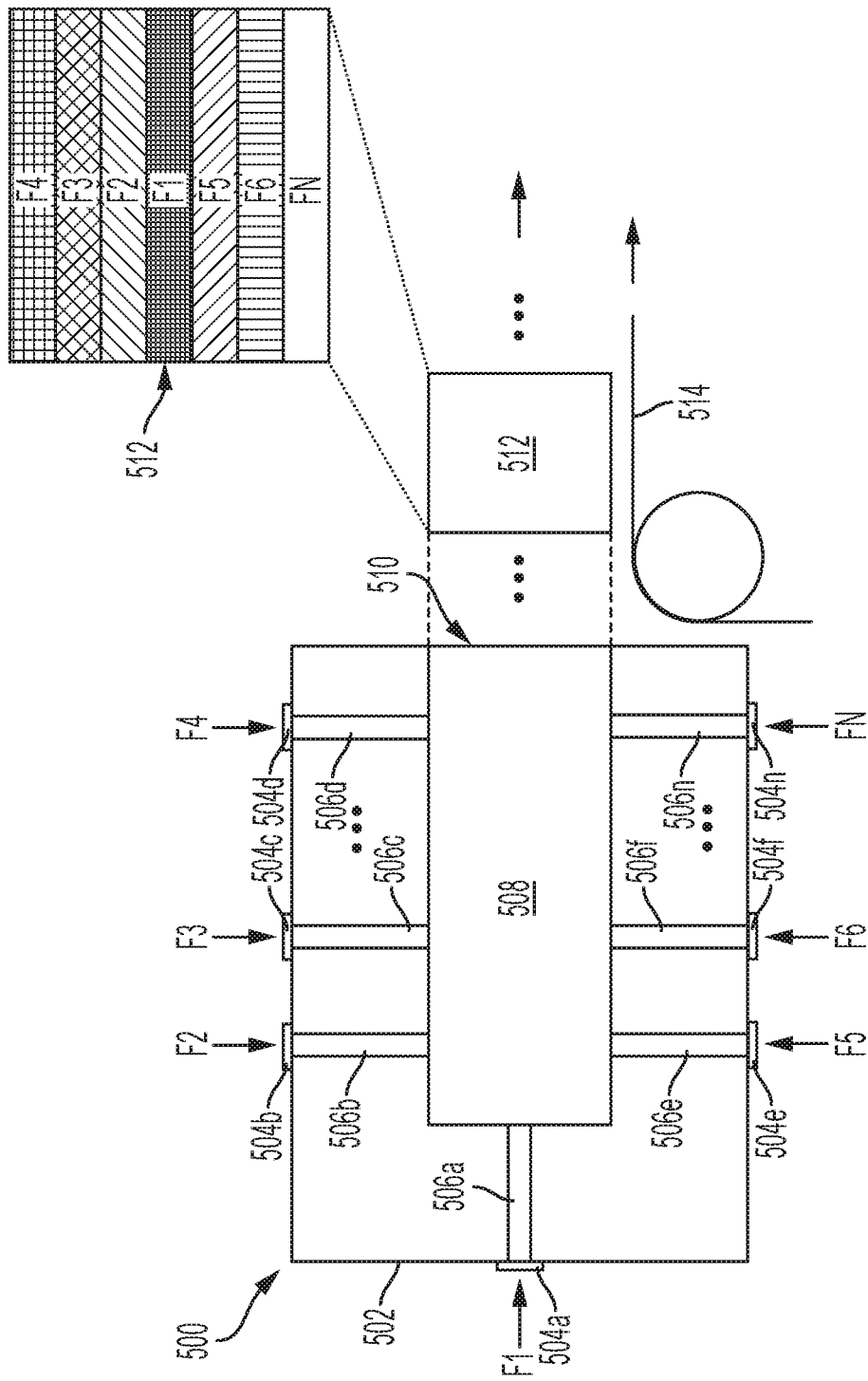
FIG. 5 illustrates a co-extrusion die configured to produce a multilayer extrusion comprising component layers of an electrochemical cell in accordance with various embodiments.

FIG. 5 illustrates a co-extrusion die configured to produce a multilayer extrusion comprising component layers of an electrochemical cell in accordance with various embodiments. The co-extrusion die 500 shown in FIG. 5 includes a manifold 502 comprising a plurality of inlet ports 504a-504n configured to receive a plurality of fluids, F1-Fn. Each of the fluids, F1-Fn, comprises material for forming a component layer of an electrochemical cell. For example, the plurality of fluids, F1-Fn, can comprise at least a first metallic ink, a second metallic ink, and a polymeric ink for forming component layers of an MEA, PEM, or battery, for example. It is understood that the term ink used herein can be interchangeable with similar terms used in the extrusion arts including, for example a slurry, dispersion, suspension, resin, gel, or paste.

The co-extrusion die 500 also includes a plurality of channels 506a-506n, each of which is fluidically coupled to one of the inlet ports 504a-504n. The channels 506a-506n are configured to separately transport the fluids, F1-Fn, from the inlet ports 504a-504n to a merge section 508 of the co-extrusion die 500. The merge section 508 is configured such that the fluids, F1-Fn, flow together in a specified order to form a multilayer extrusion 512 comprising component layers corresponding to the fluids, F1-Fn. The co-extrusion die 500 further includes an outlet port 510 fluidically coupled to the merge section 508. The outlet port 510 is configured to output the multilayer extrusion 512 onto a substrate 514, which is preferably a functional component of the electrochemical cell (e.g., a GDL or a current collector). In some embodiments, the substrate 514 can be a sacrificial carrier material rather than a functional component of the electrochemical cell.

In general, the co-extrusion die 500 can be configured to receive n-fluids for producing a multilayer extrusion 512 comprising n-layers, where n is an integer ranging from 2 to 12 (or more). The extrusion 512 with substrate 514 is subject to further processing, and is subsequently incorporated in an electrolysis cell, a fuel cell, a battery or other type of electrochemical cell. The co-extrusion die 500 and substrate 514 can be arranged and configured as components of a roll-to-roll apparatus and process for manufacturing a multilayer extrusion 512 comprising n-layers of an electrochemical cell.

Figure 6A:
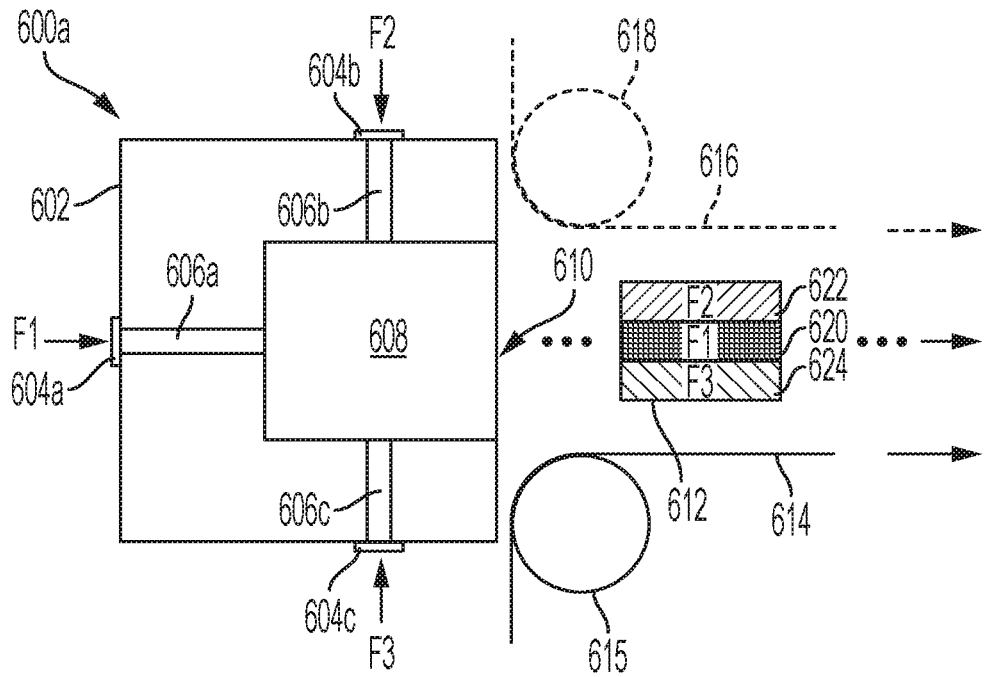
FIG. 6A illustrates a co-extrusion die configured to produce a multilayer extrusion comprising component layers of an electrochemical cell in accordance with various embodiments.

FIG. 6A illustrates a co-extrusion die configured to produce a multilayer extrusion comprising component layers of an electrochemical cell in accordance with various embodiments. The co-extrusion die 600a shown in FIG. 6A includes a manifold 602 comprising three inlet ports 604a-604c configured to receive three fluids comprising a polymeric ink F1, a first metallic ink F2, and a second metallic ink F3. Each of three channels 606a-606c of the co-extrusion die 600a is fluidically coupled to one of the three inlet ports 604a-604c and configured to separately transport the three fluids, F1-F3, to a merge section 608. The three fluids, F1-F3, flow together in the merge section 608 to form a 3-layer extrusion 612 comprising a polymeric membrane layer 620 disposed between and in contact with a first metallic layer 622 and a second metallic layer 624.

The co-extrusion die 600a also includes an outlet port 610 fluidically coupled to the merge section 608. The outlet port 610 is configured to output the extrusion 612 from the co-extrusion die 600a onto a substrate 614, which preferably comprises a functional component of the electrochemical cell. In various embodiments, the substrate 614 is transported proximate the outlet port 610 by a roller apparatus 615, such that the extrusion 612 is deposited onto the moving substrate 614 in a continuous manner. In some embodiments, a second substrate 616 can be transported proximate the outlet port 610 by a second roller apparatus 618, such that the second substrate 616 is pressed onto the exposed layer (e.g., layer 622) of the extrusion 612 in a continuous manner. The second substrate 616 is preferably a functional component of the electrochemical cell.

According to some embodiments, the co-extrusion die 600a is configured to produce a multilayer extrusion 612 comprising component layers of an MEA configured to be incorporated in an electrolysis cell or a fuel cell. In some embodiments, the three fluids, F1-F3, comprise a polymeric ink, F1, a first electrode (e.g., anode) ink F2, and a second electrode (e.g., cathode) ink F3. The polymeric ink, F1, can be an ionomer ink having a composition and properties shown in FIG. 11 (see membrane layer). The first and second electrode inks F2, F3 can be catalyst inks having a composition and properties shown in FIG. 11 (see uniform electrode layers).

In some embodiments, the polymeric ink, F1, can be a perfluorosulfonic acid (PFSA) polymer, such as Nafion®, which has low cationic and high electronic resistance, low permeability, and high toughness. A suitable polymeric (e.g., ionomeric) ink, F1, is a commercial Nafion® D2020 dispersion (e.g., 20 wt % ionomer, 34 wt % water and 44 wt % 1-propanol). D2020 has viscosity <500 cP at 25° C., which is too low for printing/extruding, so solvent content can be reduced to increase viscosity. Suitable metallic catalyst inks are Pt/C or $IrO_x$ powders in D2020. Suitable inks used for slot die coating of fuel cell electrodes, for example, contain roughly 20 wt % ionomer, 30 wt % Pt, and 50 wt % C support, which can be suitable for and/or adjusted for electrolysis cell electrodes.

The three fluids, F1-F3, are received and transported through the manifold 602 to the merge section 608, such that the fluids, F1-F3, flow together in the merge section 608 to form a 3-layer MEA extrusion 612 comprising a polymeric membrane layer 620 disposed between and in contact with a first electrode layer 622 and a second electrode layer 624. In some embodiments, the layers 620, 622, 624 of MEA extrusion 612 can have a thickness and porosity as indicated in FIG. 12. The MEA extrusion 612 is dispensed from the outlet port 610 and onto a moving substrate 614 (via roller apparatus 615) comprising a functional component of the electrochemical cell, such as a first GDL. In some embodiments, a second substrate 616 can be transported proximate the outlet port 610 via roller apparatus 618. The second substrate 616 preferably comprises a functional component of the electrochemical cell, such as a second GDL. Using the roller apparatus 618, the second substrate 616 is pressed onto the first electrode layer 622 in a continuous manner. The extrusion 612 with first and second (optional) substrates 614, 616 is subject to further processing for incorporation in an electrolysis cell or a fuel cell.

In accordance with other embodiments, the co-extrusion die 600a is configured to produce a multilayer extrusion 612 comprising component layers of a PEM structure configured to be incorporated in an electrolysis cell or a fuel cell. In some embodiments, the three fluids, F1-F3, comprise a polymeric ink, F1, a first metallic ink F2, and a second metallic ink F3. The polymeric ink, F1, can comprise an ionomer ink previously described, other proton conducting ionomer inks, or ion exchange resins.

The three fluids, F1-F3, are received and transported through the manifold 602 to the merge section 608, such that the fluids, F1-F3, flow together in the merge section 608 to form a 3-layer PEM extrusion 612 comprising a polymeric membrane layer 620 disposed between and in contact with a first metallic layer 622 and a second metallic layer 624. The first and second metallic layers 622, 624, in contact with the polymeric membrane layer 620, comprise, are made of, or have the characteristics of a metal such as Pt or Au. The thickness and continuity of coverage of the first and second metallic layers 622, 624 on the polymeric membrane layer 620 are such that the metallic first and second layers 622, 624 have low hydrogen permeability as well as good catalytic properties, and effectively reduce the amount of hydrogen crossover at the polymeric membrane layer 620.

The PEM extrusion 612 is dispensed from the outlet port 610 and onto a moving substrate 614 (via roller apparatus 615) comprising a functional component of the electrochemical cell, such as a first electrode. In some embodiments, a second substrate 616 can be transported proximate the outlet port 610 via roller apparatus 618. The second substrate 616 preferably comprises a functional component of the electrochemical cell, such as a second electrode. Using the roller apparatus 618, the second substrate 616 is pressed onto the first metallic layer 622 in a continuous manner. The extrusion 612 with first and second (optional) substrates 614, 616 is subject to further processing for incorporation in an electrolysis cell or a fuel cell. The PEM extrusion 612 can include various features disclosed in U.S. Published Patent Application No. 2006/0068253, previously incorporated herein by reference.

According to some embodiments, the co-extrusion die 600a is configured to produce a multilayer extrusion 612 comprising component layers of a battery structure configured to be incorporated in a battery cell. In some embodiments, the three fluids, F1-F3, comprise a polymeric ink, F1, a first electrode ink F2, and a second electrode ink F3. The polymeric ink, F1, first electrode ink F2, and second electrode ink F3 can be of a type described herein. The three fluids, F1-F3, are received and transported through the manifold 602 to the merge section 608, such that the fluids, F1-F3, flow together in the merge section 608 to form a 3-layer battery structure extrusion 612 comprising a polymeric separator 620 disposed between and in contact with a first electrode layer 622 and a second electrode layer 624.

The battery structure extrusion 612 is dispensed from the outlet port 610 and onto a moving substrate 614 (via roller apparatus 615) comprising a functional component of the electrochemical cell, such as a first current collector (e.g., a metallic foil). In some embodiments, a second substrate 616 can be transported proximate the outlet port 610 via roller apparatus 618. The second substrate 616 preferably comprises a functional component of the battery cell, such as a second current collector (e.g., a metallic foil). Using the roller apparatus 618, the second substrate 616 is pressed onto the first electrode layer 622 in a continuous manner. The extrusion 612 with first and second (optional) substrates 614, 616 is subject to further processing for incorporation in a battery cell. The battery structure extrusion 612 can include various features disclosed in commonly-owned U.S. Pat. No. 9,337,471, previously incorporated herein by reference.

Figure 6B:
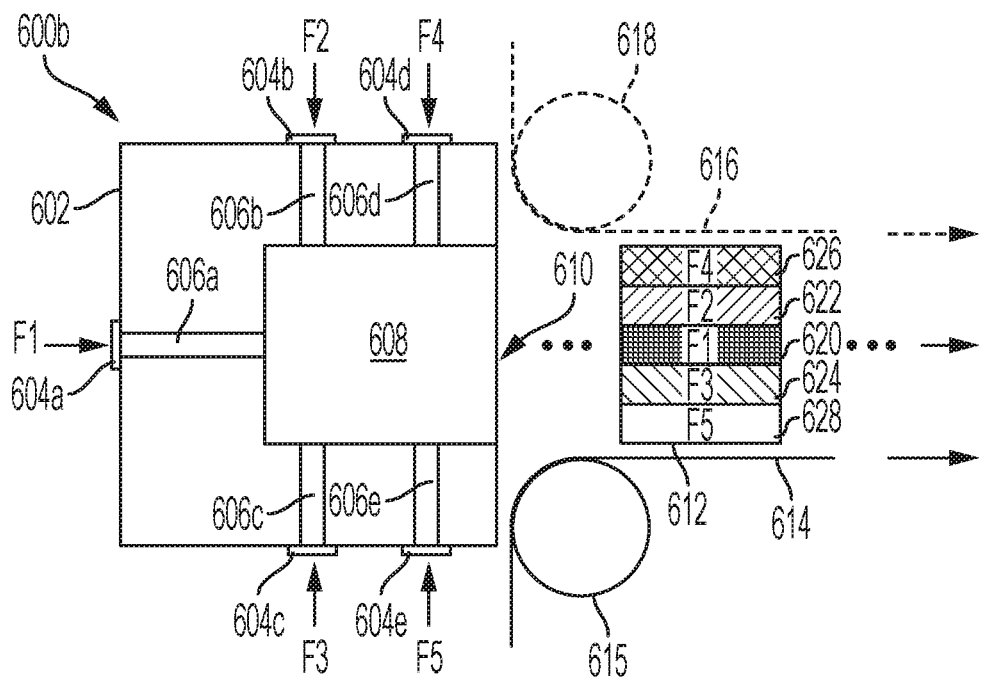
FIG. 6B illustrates a co-extrusion die configured to produce a multilayer extrusion comprising component layers of an electrochemical cell in accordance with various embodiments.

FIG. 6B illustrates a co-extrusion die configured to produce a multilayer extrusion comprising component layers of an electrochemical cell in accordance with various embodiments. The co-extrusion die 600b shown in FIG. 6B includes a manifold 602 comprising five inlet ports 604a-604e configured to receive five fluids, F1-F5, comprising a polymeric ink F1, a first electrode (e.g., anode) ink F2, a second electrode (e.g., cathode) ink F3, a first microporous layer (MPL) ink F4, and a second MPL ink F5. Each of five channels 606a-606e of the co-extrusion die 600b is fluidically coupled to one of the five inlet ports 604a-604e and configured to separately transport the five fluids, F1-F5, to a merge section 608. The five fluids, F1-F5, flow together in the merge section 608 to form a 5-layer extrusion 612 comprising, in order, a first MPL 626, a first electrode layer 622, a polymeric membrane layer 620, a second electrode layer 624, and a second MPL 628. In some embodiments, the layers 620, 622, 624, 626, 628 of the extrusion 612 can have a thickness and porosity as indicated in FIG. 12.

The co-extrusion die 600b also includes an outlet port 610 fluidically coupled to the merge section 608. The outlet port 610 is configured to output the extrusion 612 from the co-extrusion die 600b onto a substrate 614, which preferably comprises a GDL. As was previously described, the substrate 614 can be transported proximate the outlet port 610 by a roller apparatus 615, such that the extrusion 612 is deposited onto the substrate 614 in a continuous manner. In some embodiments, a second substrate 616 can be transported proximate the outlet port 610 by a second roller apparatus 618, such that the second substrate 616 is pressed onto the exposed layer (e.g., layer 626) of the extrusion 612 in a continuous manner. The second substrate 616 is preferably a GDL.

The polymeric ink F1, first electrode ink F2, second electrode ink F3, first MPL ink F4, and second MPL ink F5 can have a composition and properties shown in FIG. 11 (see membrane, uniform electrode layers, and MPLs). Suitable inks for carbon (C) and titanium (Ti) microporous layers can initially contain carbon black or Ti powder and PTFE in water and 1-propanol. The first GDL 614 (e.g., cathode GDL) and second (optional) GDL 616 (e.g., anode GDL) can have a composition and properties shown in FIGS. 11 and 12 (see cathode and anode GDLs).

Figure 6C:
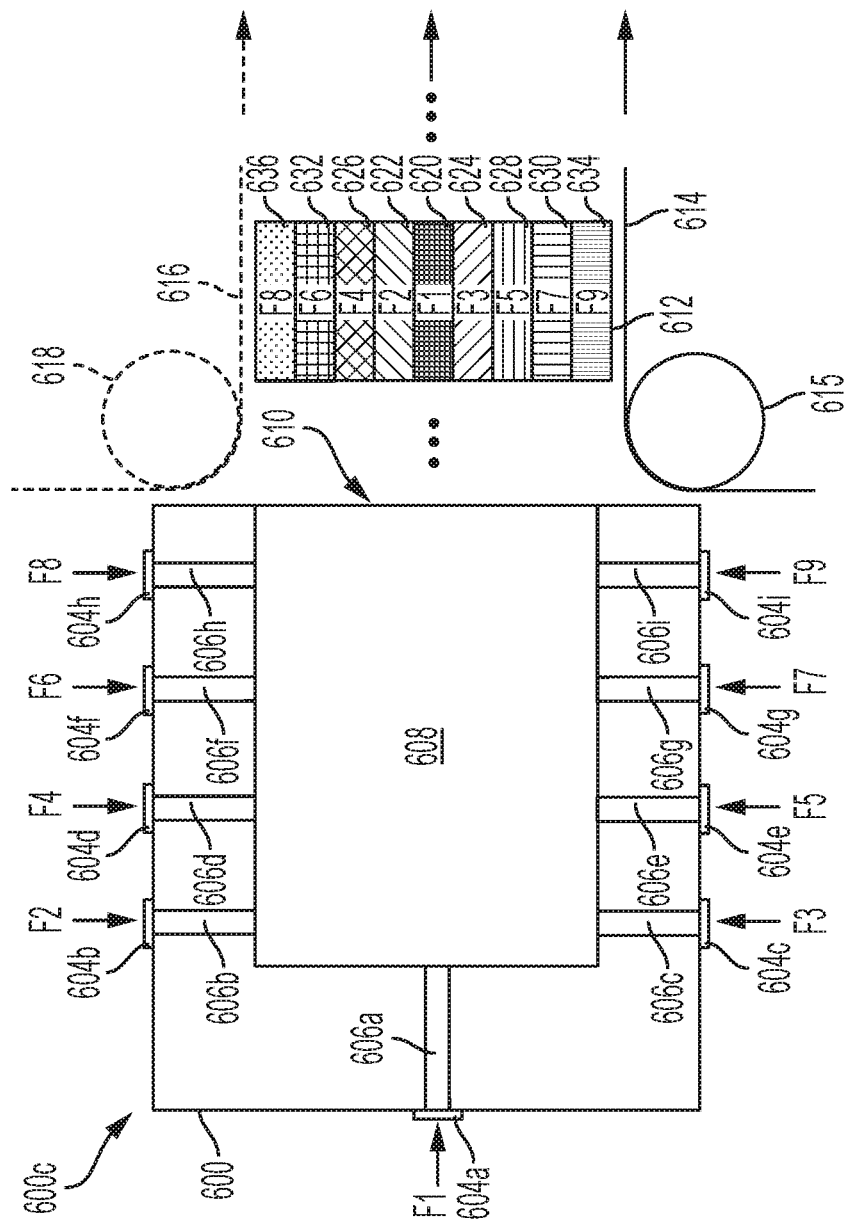
FIG. 6C illustrates a co-extrusion die configured to produce a multilayer extrusion comprising component layers of an electrochemical cell in accordance with various embodiments.

FIG. 6C illustrates a co-extrusion die configured to produce a multilayer extrusion comprising component layers of an electrochemical cell in accordance with various embodiments. The co-extrusion die 600c shown in FIG. 6C includes a manifold 602 comprising nine inlet ports 604a-604i configured to receive nine fluids, F1-F9, comprising a polymeric ink F1, three graded first electrode (e.g., anode) inks F2, F4, F6, three graded second electrode (e.g., cathode) inks F3, F5, F7, a first MPL ink F8, and a second MPL ink F9. Each of nine channels 606a-606i of the co-extrusion die 600c is fluidically coupled to one of the nine inlet ports 604a-604i and configured to separately transport the nine fluids, F1-F9, to a merge section 608. The nine fluids, F1-F9, flow together in the merge section 608 to form a 9-layer extrusion 612 comprising, in order, a first MPL 636, three graded first electrode (e.g., anode) layers 632, 626, 622, a polymeric membrane layer 620, three graded second electrode (e.g., cathode) layers 624, 628, 630, and a second MPL 634. In some embodiments, the layers 620, 622, 624, 626, 628, 630, 632, 634, 636 of the extrusion 612 can have a thickness and porosity as indicated in FIG. 12.

The co-extrusion die 600c also includes an outlet port 610 fluidically coupled to the merge section 608. The outlet port 610 is configured to output the extrusion 612 from the co-extrusion die 600c onto a substrate 614, which preferably comprises a GDL. As was previously described, the substrate 614 can be transported proximate the outlet port 610 by a roller apparatus 615, such that the extrusion 612 is deposited onto the substrate 614 in a continuous manner. In some embodiments, a second substrate 616 can be transported proximate the outlet port 610 by a second roller apparatus 618, such that the second substrate 616 is pressed onto the exposed layer (e.g., layer 636) of the extrusion 612 in a continuous manner. The second substrate 616 is preferably a GDL.

The polymeric ink F1, three graded first electrode (e.g., anode) inks F2, F4, F8, three graded second electrode inks F3, F5, F7, first MPL ink F8, and second MPL ink F9 can have a composition and properties shown in FIG. 11 (see membrane, graded electrodes, and MPLs). Suitable inks for C and Ti microporous layers can initially contain carbon black or Ti powder and PTFE in water and 1-propanol. The first GDL 614 (e.g., cathode GDL) and second (optional) GDL 616 (e.g., anode GDL) can have a composition and properties shown in FIGS. 11 and 12 (see cathode and anode GDLs).

Figure 7:
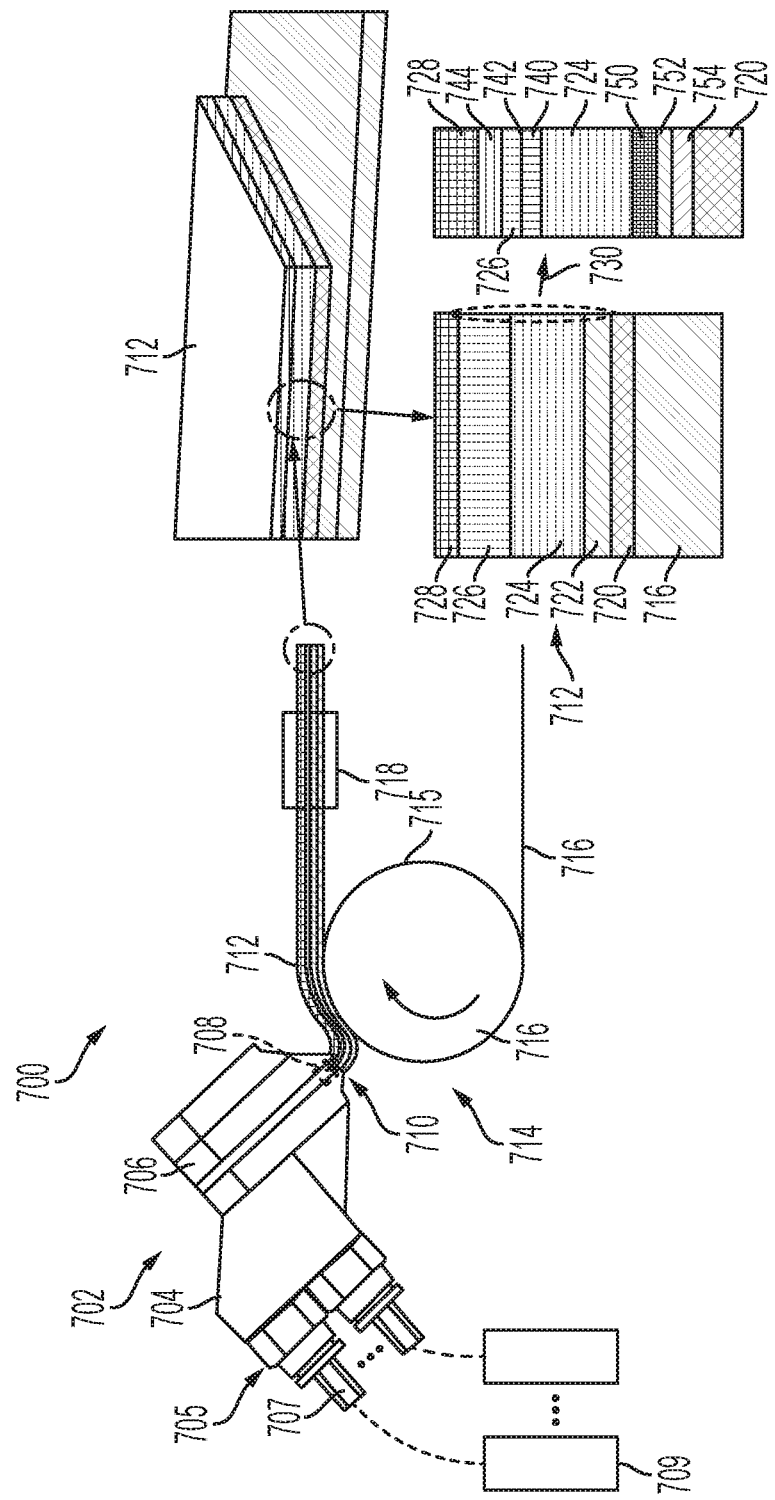
FIG. 7 shows an apparatus for producing a multilayer extrusion comprising components of an electrochemical cell in accordance with various embodiments.

FIG. 7 shows an apparatus for producing a multilayer extrusion comprising components of an electrochemical cell in accordance with various embodiments. The apparatus 700 shown in FIG. 7 is configured to produce a multilayer MEA extrusion in a continuous manner via a roll-to-roll manufacturing process. The apparatus 700 includes a co-extrusion die 702 comprising a manifold 704 fluidically coupled to a plurality of channels disposed within an arrangement of plenums 706. The manifold 704 includes a plurality of inlet ports 705 each of which is configured to receive a pressurized fluid 707 from a pressurized vessel 709. The pressure of each vessel 709 and therefore each fluid 707 can be controlled separately via a controllable pressure-generating source (e.g., computer or processor-controlled pump). As was discussed previously, each of the fluids 707 corresponds to one of the layers of the MEA extrusion 712. The channels disposed within the plenums 706 converge at a merge section 708, such that the fluids flow together in the merge section 708 to form the multilayer extrusion 712.

A continuous flow of the multilayer extrusion 712 is output from an outlet port 710 of the co-extrusion die 702 and deposited onto a moving substrate 716, which is preferably a functional component of the electrochemical cell (e.g., a GLD). The substrate 716 can be transported by a roller apparatus 714 comprising one or more rollers 715 that feed the substrate 716 in a continuous manner in close proximity to the extrusion 712. The extrusion 712 supported by the substrate 716 is advanced into an annealing station 718 where the extrusion 712 is annealed and dried. Although not shown in FIG. 7, the apparatus 700 can further include a die cutting station for singulating the continuous extrusion 712 into individual MEA structures. A hot press station can precede or follow the die cutting station for pressing a second substrate, such as a second GDL, onto the exposed layer of the extrusion 712 or singulated MEA structures.

FIG. 7 also shows an exploded view of the multilayer extrusion 712 produced by the co-extrusion die 702. In the embodiment shown in FIG. 7, the multilayer extrusion 712 includes an MEA structure 730 comprising, in order, a carbon microporous layer 720, graded cathode layers 722, a polymer membrane layer 724, graded anode layers 726, and a titanium microporous layer 728. As is further shown in FIG. 7, the graded cathode layers 720 includes a first cathode layer 750 with high cathode material loading/low porosity, a second cathode layer 752 with medium cathode material loading/medium porosity, and a third cathode layer 754 with low cathode material loading/high porosity. The first cathode layer 750 with high cathode material loading is in contact with the polymeric membrane layer 724, the third cathode layer 754 with low cathode material loading is in contact with the carbon microporous layer 720, and the second cathode layer 752 with medium cathode material loading is disposed between the first and third cathode layers 750, 754.

The graded anode layer 726 includes a first anode layer 740 with high anode material loading/low porosity, a second anode layer 742 with medium anode material loading/medium porosity, and a third anode layer 744 with low anode material loading/high porosity. The first anode layer 740 with high anode material loading is in contact with the polymeric membrane layer 724, the third anode layer 744 with low anode material loading is in contact with the titanium microporous layer 728, and the second anode layer 742 with medium anode material loading is disposed between the first and third anode layers 740, 744. The layers of the multilayer extrusion 712 can be formed from inks and have a composition and properties shown in FIGS. 11 and 12.

Figure 8:
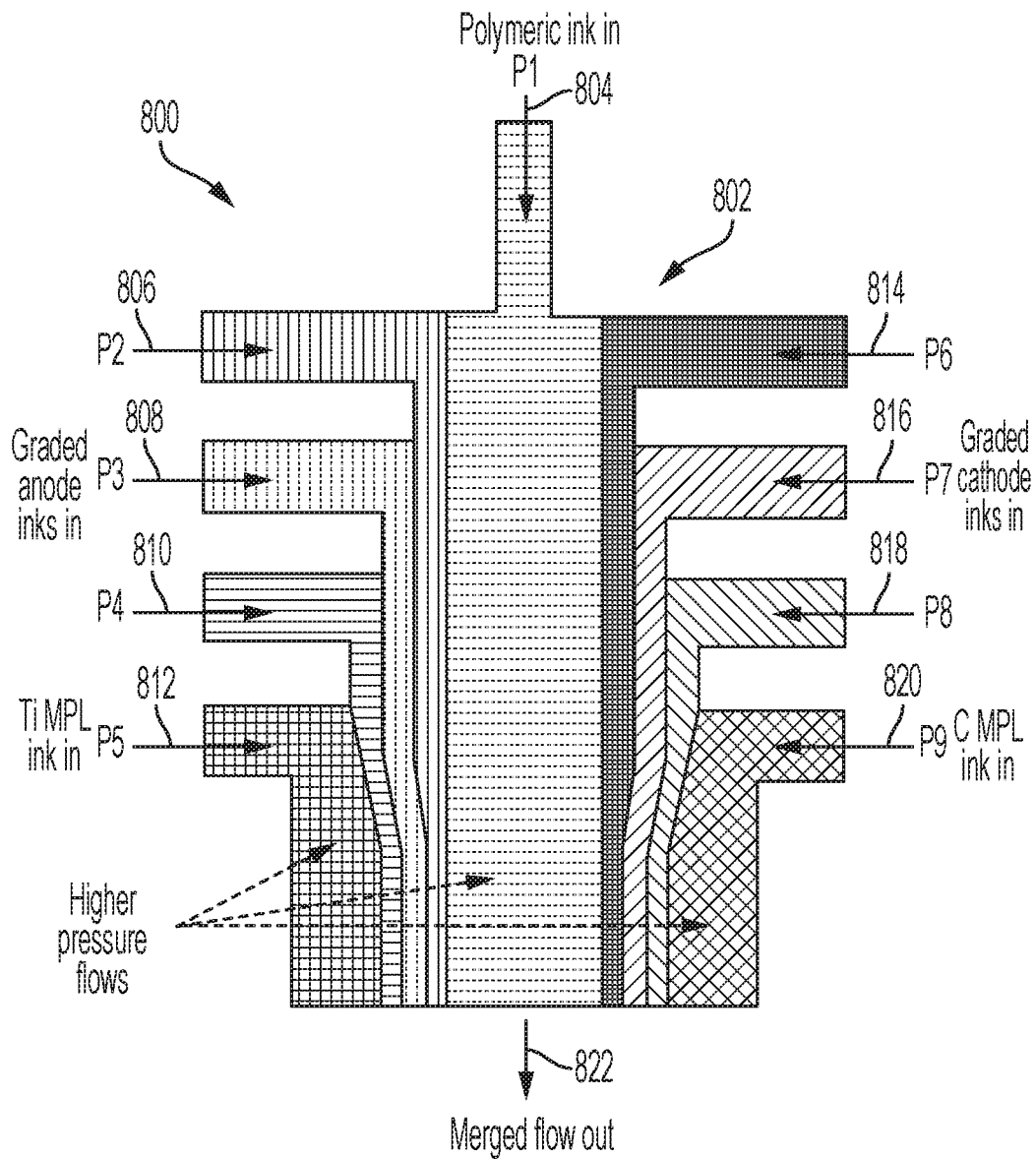
FIG. 8 is a cross-sectional view showing a portion of a co-extrusion die in accordance with various embodiments.

FIG. 8 is a cross-sectional view showing a portion of a co-extrusion die in accordance with various embodiments. The formation of thin layers by a co-extrusion die of the present disclosure, such as die 800 shown in FIG. 8, relies on the principle of co-extrusion, where viscous fluids are used to shape the structure of other viscous fluids by traveling through converging fluidic paths. By tuning pressures of the viscous fluids, one fluid can be used to squeeze another into smaller dimensions in a laminar fashion. By using fluids of sufficiently high viscosities, the merged output 822 retains the shapes of each component without mixing. In general, the thickness of each ink within the merge section 802 is dependent on the viscosity and pressure of each ink. Higher pressure ink flows correspond to thicker ink layers within the merge section 802. As is shown in FIG. 8, higher pressure flows for polymeric ink 804, Ti MPL ink 812, and C MPL ink 820 result in increased thickness of these ink layers relative to the other ink layers within the merge section 802. Formulations of inks 804-820 can be selected and adjusted to produce MEAs with desired electrochemical properties while meeting extrusion and stability requirements. Preferably, all inks 804-820 use the same solvent system.

The co-extrusion die 800 individually shapes the fluid streams, then merges the flows stepwise before they exit the output port or nozzle. As is shown in FIG. 8, a polymeric ink 804 is merged with the innermost of graded anode and cathode ink flows 806, 814. Since the polymeric ink 804 is at relatively higher pressure, it forces the graded anode and cathode ink flows 806, 814 into thinner streams. As additional graded anode and cathode ink flows 808, 816 and 810, 818 are added, their streams are similarly kept thin. At the last step, flows 812, 820 for the microporous layer inks are added. These flows are also at higher pressure than the graded anode and cathode inks 806, 808, 810, 814, 816, 818, thereby thinning the these layers further.

The portion of the co-extrusion die 800 shown in FIG. 8 includes a plurality of channels converging at a merge section 802 of the die 800 for forming the multilayer extrusion shown in FIG. 7. More particularly, the co-extrusion die 800 is configured to produce a 9-layer MEA extrusion according to various embodiments. It is understood that the co-extrusion die 800 shown in FIG. 8 can include more or less than nine channels depending on the number of layers to be included in the multilayer extrusion.

A polymeric ink 804 is introduced at a pressure P1 into the merge section 802 so that it flows longitudinally through the central portion of the merge section 802. The remaining eight inks 806-820 are introduced into the merge section 802 at an oblique or right angle to the polymeric ink 804 respectively at pressures P2-P9, which facilitates formation, positioning, and thickness control of each layer of the extrusion within the merge section 802. In the embodiment shown in FIG. 8, graded anode inks 806, 808, 810 are individually introduced at pressures P2, P3, P4 into the merge section 802 at staggered locations along the longitudinal axis of the merge section 802 such that graded anode ink 806 first contacts the polymeric ink 804, followed by graded anode ink 808 contacting graded anode ink 806, followed by graded anode ink 810 contacting graded anode ink 808.

The graded anode inks 806, 808, 810 are thinner than the polymeric ink 804 due to pressure P1 being higher than pressures P2, P3, P4. As was described previously, graded anode ink 806 has the highest anode material loading/lowest porosity, graded anode ink 810 has the lowest anode material loading/highest porosity, and graded anode ink 808 has medium anode material loading/medium porosity between that of graded anode inks 806 and 810. A Ti MPL ink 812 is introduced into the merge section 802 at pressure P5 downstream of the graded anode inks 806, 808, 810 such that the Ti MPL ink 812 contacts the graded anode ink 810. Because pressure P5 is higher than pressures P2, P3, P4, the Ti MPL ink 812 forces the graded anode inks 806, 808, 810 into thinner streams.

Graded cathode inks 814, 816, 818 are individually introduced at pressures P6, P7, P8 into the merge section 802 at staggered locations along the longitudinal axis of the merge section 802 such that graded cathode ink 814 first contacts the polymeric ink 804, followed by graded cathode ink 816 contacting graded cathode ink 814, followed by graded cathode ink 818 contacting graded cathode ink 816. The graded cathode inks 814, 816, 818 are thinner than the polymeric ink 804 due to the pressure P1 being higher than pressures P6, P7, P8. As was described previously, graded cathode ink 814 has the highest cathode material loading/lowest porosity, graded cathode ink 818 has the lowest cathode material loading/highest loading, and graded cathode ink 816 has medium cathode material loading/medium porosity between that of graded cathode inks 814 and 818. A C MPL ink 820 is introduced into the merge section 802 at pressure P9 downstream of the graded cathode inks 814, 816, 818 such that the C MPL ink 820 contacts the graded cathode ink 818. Because pressure P9 is higher than pressures P6, P7, P8, the C MPL ink 820 forces the graded cathode inks 814, 816, 818 into thinner streams. A merged flow 822 comprising inks 804-820 is output from the merge section 802 as an MEA extrusion.

The viscosity of the polymeric ink 804 (e.g., ionomer dispersion) can be controlled by varying solvent concentration or adding modifiers, such as TiO. The viscosity of the graded anode and cathode inks 806-810 and 814-818 can be tuned by adjusting solvent concentration. Graded anode and cathode ink viscosity is dependent on the polymeric ink viscosity, and these layers can be made thin by hydrodynamic focusing. Graded anode and cathode ink catalyst content can be tuned so that desired electrochemical cell efficiency is achieved. The microporous inks 812 and 820, when dried, typically have a porosity in the range of 35-50%, and may need additional porogens, such as ammonium carbonate which will decompose during annealing to achieve the target dry porosity. Microporous inks 812 and 820 additionally serve to shape the electrode layers 806-810 and 814-818. Since the microporous ink layers 812, 820 are the outermost extruded layers, their viscosities should be carefully tuned. The layers of the merged flow 822 can be formed from inks and have a composition and properties shown in FIGS. 11 and 12.

Figure 9A:
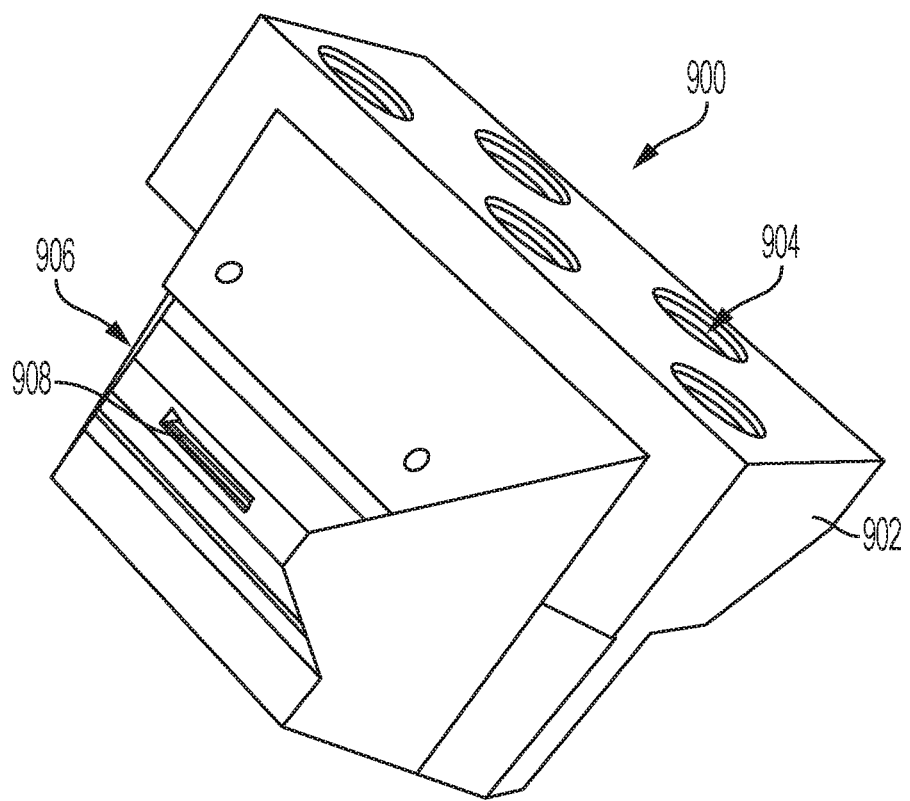
FIGS. 9A and 9B are views of a co-extrusion die in accordance with various embodiments.
Figure 9B:
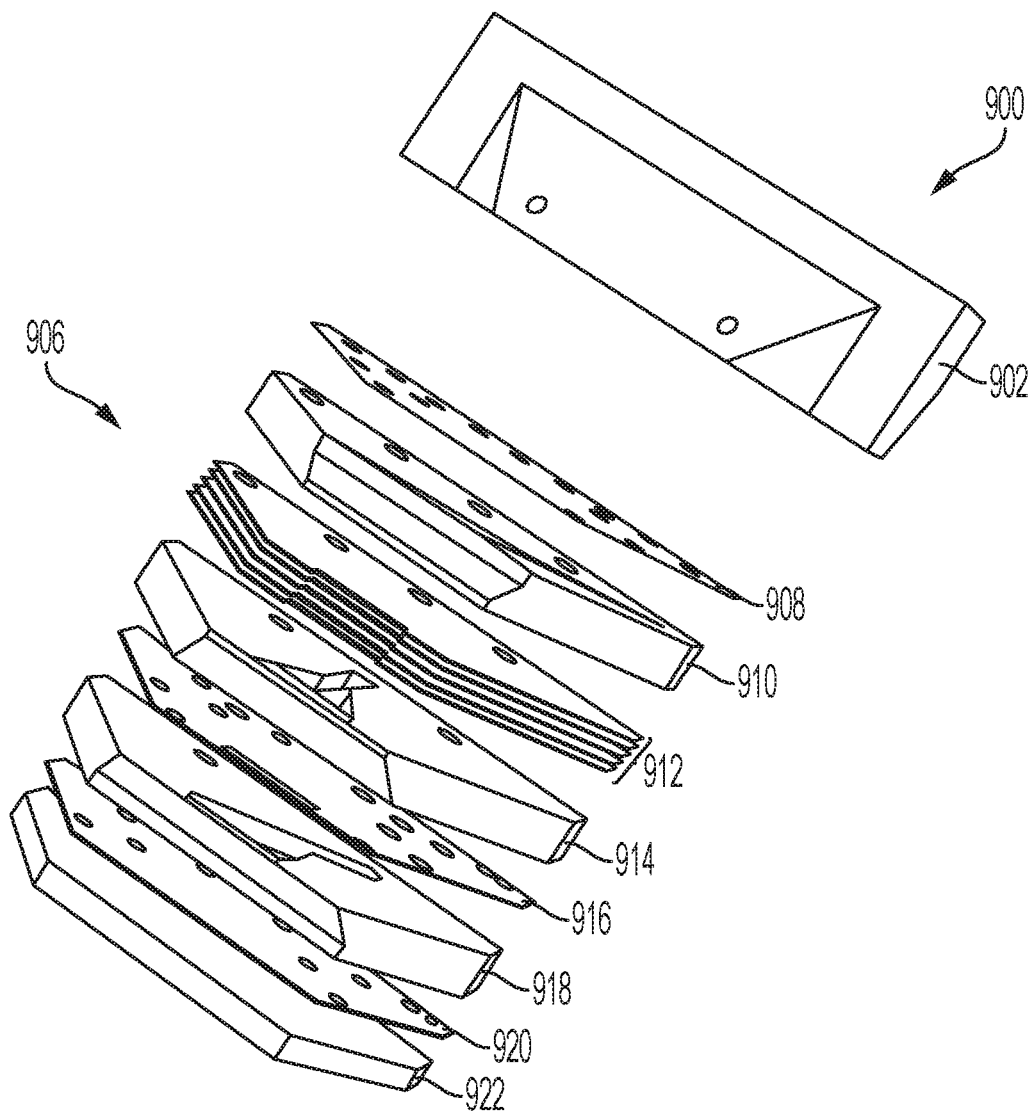

FIGS. 9A and 9B are views of a co-extrusion die in accordance with various embodiments. FIG. 9A shows the exterior of the co-extrusion die 900 which includes a manifold 902, a plenum section 906, and an outlet port or nozzle 908. The plenum section 906 includes a plurality of fluid channels which converge at a merge section 907 proximate the outlet port 908. The manifold 902 includes a plurality of inlet ports 904 each of which is configured to receive a pressurized fluid (e.g., ink). The inlet ports 904 are fluidically coupled to the channels provided within the plenum section 906. In the embodiment shown in FIGS. 9A and 9B, the manifold 902 includes five inlet ports 904 for producing a multilayer extrusion comprising five layers. It is understood that the number of inlet ports 904 can range from 2 to 12 (or more), for example, and that the manifold 902 comprising five inlet ports 904 is provided for purposes of illustration and not of limitation.

FIG. 9B is an exploded view of the co-extrusion die 900 which shows individual components of the plenum section 906 and the merge section 907. The plenum section 906 is configured to develop uniform, streamlined ink flows and shape the ink flows to their full width (e.g., width of an MEA extrusion). In the plenum section 906, each ink flow has its own channel, and the ink layers combine in the merge section 907 into a single structure only after each ink layer has been individually spread by its respective channel to its full width. The plenum section 906 includes a bottom plenum 910, a middle plenum 914, and a top plenum 918. Each of the plenums 910, 914, 918 includes at least one channel for transporting and shaping a fluid from an inlet port 904 to the merge section 907. In the embodiment shown in FIG. 9B, the bottom plenum 910 includes a first channel and a second channel respectively formed on first and second opposing surfaces of the bottom plenum 910. The middle plenum 914 includes a third channel formed on one surface of the middle plenum 914. The top plenum 918 includes a fourth channel and a fifth channel respectively formed on first and second opposing surfaces of the top plenum 918.

A first gasket 908 is disposed between the manifold 904 and the bottom plenum 910. A second gasket 916 is disposed between the middle plenum 914 and the top plenum 918. A third gasket 920 is disposed between the top plenum 918 and a top plate 922. Positioned between the bottom plenum 910 and the middle plenum 914 are nozzle sheets 912. The number (e.g., five) of nozzle sheets 912 corresponds to the number of channels provided within the plenum section 906.

Figure 10A:
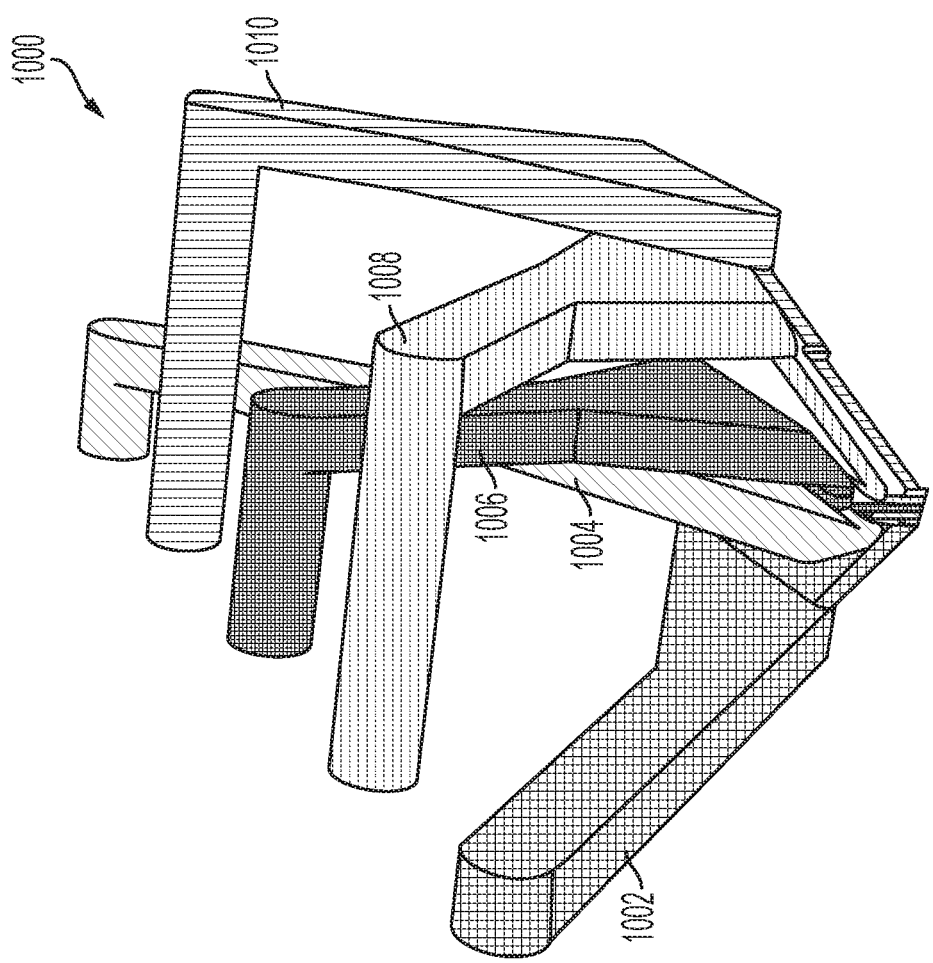
FIGS. 10A and 10B are views of the fluid channels provided within a plenum section of the co-extrusion die shown in FIGS. 9A and 9B.
Figure 10B:
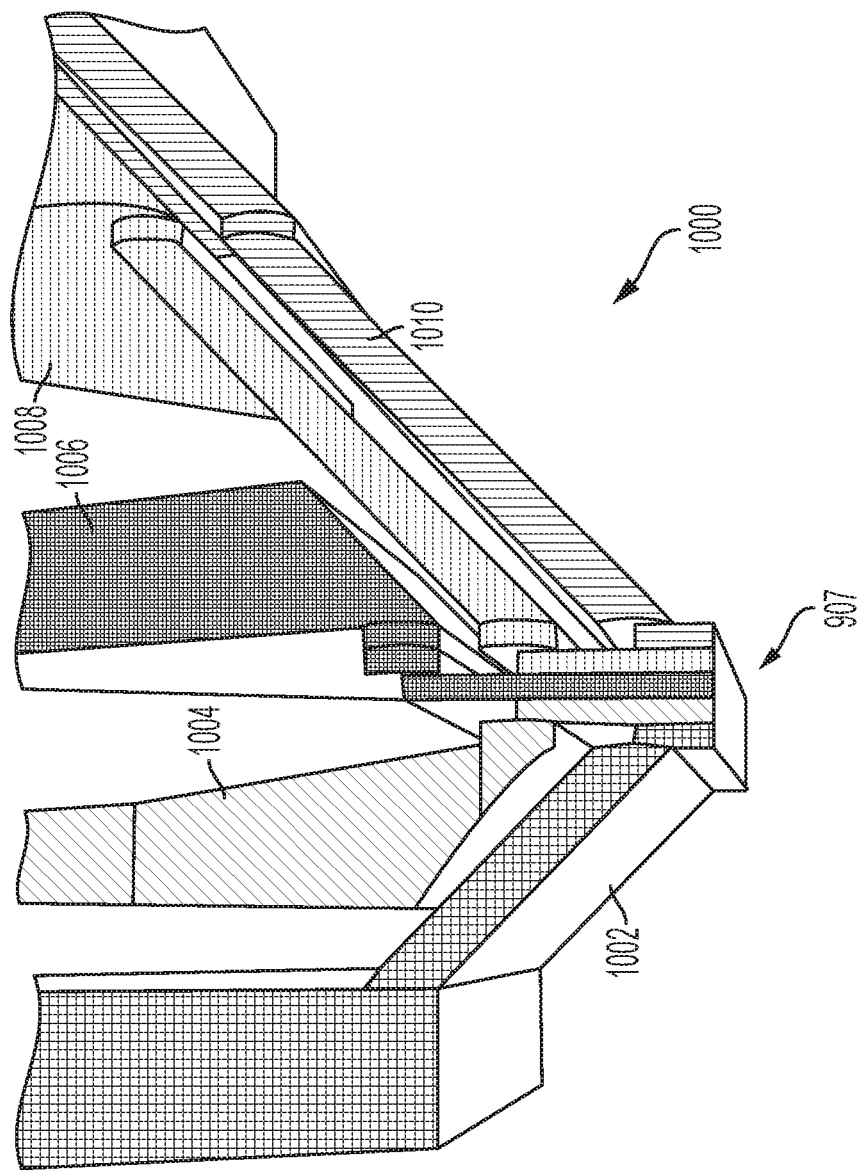

FIGS. 10A and 10B are views of the fluid channels provided within the plenum section 906 of the co-extrusion die 900 shown in FIGS. 9A and 9B. Each of the channels 1002, 1004, 1006, 1008, 1010 is fluidically coupled to one of the inlet ports 904 provided at the manifold 902. Fluids are transported through the channels 1002, 1004, 1006, 1008, 1010 and converge at the merge section 907. As previously discussed, it is understood that the number of fluid channels provided within the plenum section 906 can range from 2 to 12 (or more), depending on the number of layers of the multilayer extrusion produced by the co-extrusion die 900.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality.

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

What is claimed is:

1. A co-extrusion die configured to produce a multilayer extrusion comprising component layers of an electrochemical cell, the die comprising:
   a plurality of inlet ports configured to receive a plurality of pressurized fluids comprising at least a first metallic ink, a second metallic ink, and a polymeric ink, the plurality of inlet ports comprising a first inlet port oriented along a longitudinal axis of the die;
   a plurality of channels comprising a first channel orientated along the longitudinal axis of the die and a plurality of additional channels each oriented at an oblique angle or a right angle to the longitudinal axis of the die, the first channel fluidically coupled to the first inlet port, the plurality of additional channels arranged in a staggered arrangement along the longitudinal axis of the die, a first set of the additional channels arranged on a first side of the first channel and a second set of the additional channels arranged on a second side of the first channel opposing the first side, and each of the plurality of additional channels comprising an outlet to the first channel;
   the plurality of channels configured to separately transport and shape the plurality of fluids from the plurality of inlet ports to a merge section situated at the outlets of the plurality of channels, such that the plurality of fluids flow intact and in contact together in the merge section in a serialized manner and in accordance with the staggered arrangement to form the multilayer extrusion comprising a polymeric membrane layer disposed between and in contact with a first metallic layer and a second metallic layer;
   an outlet port fluidically coupled to the merge section, the outlet port configured to output the multilayer extrusion onto a substrate of the electrochemical cell, the multilayer extrusion comprising an inner layer, an outer layer, and one or more middle layers disposed between the inner and outer layers; and
   the die fluidically coupled to a plurality of pumps each separately coupled to a respective one of the plurality of inlet ports for pressurizing a respective one of the plurality of pressurized fluids, the plurality of pumps configured to adjust a pressure of the plurality of pressurized fluids, and a viscosity of the plurality of fluids is adjusted such that the one or more middle layers are reduced in thickness relative to the outer layer which is increased in thickness.

2. The die of claim 1, wherein:
the multilayer extrusion defines layers of a membrane electrode assembly (MEA);
the first and second metallic layers define first and second electrode layers of the MEA; and
the substrate comprises a gas diffusion layer.

3. The die of claim 2, wherein:
the plurality of inlets are configured to receive a first microporous layer ink and a second microporous layer ink; and
the plurality of channels are configured to separately transport the plurality of fluids including the first microporous layer ink and the second microporous layer ink to the merge section, such that the plurality of fluids flow together in the merge section to form the multilayer extrusion comprising, in order, a first microporous layer, the first electrode layer, the polymeric membrane layer, the second electrode layer, and a second microporous layer.

4. The die of claim 1, wherein:
the multilayer extrusion defines layers of a proton exchange membrane (PEM); and
the first and second metallic layers are configured to have low hydrogen permeability sufficient to reduce an amount of hydrogen crossover at the polymeric membrane layer relative the PEM devoid of the first and second metallic layers.

5. The die of claim 4, wherein:
the plurality of inlet ports are configured to receive a first electrode ink and a second electrode ink; and
the plurality of channels are configured to separately transport the plurality of fluids including the first and second electrode inks from the plurality of inlet ports to the merge section, such that the plurality of fluids flow together in the merge section to form the multilayer extrusion comprising the PEM disposed between and in contact with the first and second metallic layers, a first electrode layer in contact with the first metallic layer, and a second electrode layer in contact with the second electrode layer.

6. The die of claim 1, wherein:
the multilayer extrusion defines layers of a battery;
the polymeric membrane defines a polymeric separator of the battery;
the first and second metallic layers define first and second electrodes of the battery; and
the substrate comprises a current collector.

7. The die of claim 1, wherein:
the plurality of inlet ports are configured to receive a plurality of graded first metallic inks having different electrode material loading; and
the plurality of channels are configured to separately transport the plurality of fluids including the plurality of graded first metallic inks to the merge section, such that the plurality of fluids flow together in the merge section to form the multilayer extrusion comprising the polymeric membrane layer disposed between a second electrode layer and a plurality of graded first electrode layers.

8. The die of claim 7, wherein the plurality of graded first electrode layers are situated relative to the polymeric membrane layer in an order based on electrode material loading, such that a graded first electrode layer with highest electrode material loading is closest to the polymeric membrane layer and a graded first electrode layer with lowest electrode material loading is furthest away from the polymeric membrane layer.

9. The die of claim 8, wherein the die comprises at least three inlet ports and at least three channels respectively configured to receive and transport at least three graded first metallic inks to the merge section.

10. The die of claim 7, wherein:
the plurality of inlet ports are configured to receive a plurality of graded second metallic inks having different electrode material loading; and
the plurality of channels are configured to separately transport the plurality of fluids including the plurality of graded second metallic inks to the merge section, such that the plurality of fluids flow together in the merge section to form the multilayer extrusion comprising the polymeric membrane layer disposed between a plurality of graded second electrode layers and the plurality of graded first electrode layers.

11. The die of claim 10, wherein the plurality of graded second electrode layers are situated relative to the polymeric membrane layer in an order based on electrode material loading, such that a graded second electrode layer with highest electrode material loading is closest to the polymeric membrane layer and a graded second electrode layer with lowest electrode material loading is furthest away from the polymeric membrane layer.

12. The die of claim 11, wherein the die comprises at least three inlet ports and at least three channels respectively configured to receive and transport at least three graded second metallic inks to the merge section.

13. The die of claim 1, wherein the plurality of channels are spaced apart along a longitudinal axis of the merge section such that the plurality of fluids flow in contact together in the merge section in a specified order to form the multilayer extrusion.

14. An apparatus comprising the die of claim 1, comprising:
a transport mechanism configured to move the substrate into contact with a surface of the multilayer extrusion;
wherein the substrate comprises a functional component of the electrochemical cell.

15. An apparatus comprising the die of claim 1, comprising:
a first transport mechanism configured to move a first substrate into contact with a first surface of the multilayer extrusion; and
a second transport mechanism configured to move a second substrate into contact with a second surface of the multilayer extrusion;
wherein the first substrate comprises a first functional component of the electrochemical cell, and the second substrate comprises a second functional component of the electrochemical cell.

16. A co-extrusion die configured to produce a multilayer extrusion comprising layers of an electrochemical cell, the die comprising:
a plurality of inlet ports configured to receive a plurality of pressurized fluids comprising at least a polymeric ink, a first microporous layer ink, a second microporous layer ink, a plurality of graded first electrode inks having different electrode material loading, and a plurality of graded second electrode inks having different electrode material loading, the plurality of inlet ports comprising a first inlet port oriented along a longitudinal axis of the die;

a plurality of channels comprising a first channel orientated along the longitudinal axis of the die and a plurality of additional channels each oriented at an oblique angle or a right angle to the longitudinal axis of the die, the first channel fluidically coupled to the first inlet port, the plurality of additional channels arranged in a staggered arrangement along the longitudinal axis of the die, a first set of the additional channels arranged on a first side of the first channel and a second set of the additional channels arranged on a second side of the first channel opposing the first side, and each of the plurality of additional channels comprising an outlet to the first channel;

the plurality of channels configured to separately transport and shape the plurality of fluids from the plurality of inlet ports to a merge section situated at the outlets of the plurality of channels, such that the plurality of fluids flow intact and in contact together in the merge section in a serialized manner and in accordance with the staggered arrangement to form the multilayer extrusion comprising, in order, a first microporous layer, a plurality of graded first electrode layers, a polymeric membrane layer, a plurality of graded second electrode layers, and a second microporous layer;

an outlet port fluidically coupled to the merge section, the outlet port configured to output the multilayer extrusion onto a substrate, the multilayer extrusion comprising an inner layer, an outer layer, and one or more middle layers disposed between the inner and outer layers; and the die fluidically coupled to a plurality of pumps each separately coupled to a respective one of the plurality of inlet ports for pressurizing a respective one of the plurality of pressurized fluids, the plurality of pumps configured to adjust a pressure of the plurality of pressurized fluids, and a viscosity of the plurality of fluids is adjusted such that the one or more middle layers are reduced in thickness relative to the outer layer which is increased in thickness.

17. The die of claim 16, wherein:

the plurality of graded first electrode layers are situated relative to the polymeric membrane layer in an order based on electrode material loading, such that a graded first electrode layer with highest electrode material loading is closest to the polymeric membrane layer and a graded first electrode layer with lowest electrode material loading is furthest away from the polymeric membrane layer; and the plurality of graded second electrode layers are situated relative to the polymeric membrane layer in an order based on electrode material loading, such that a graded second electrode layer with highest electrode material loading is closest to the polymeric membrane layer and a graded second electrode layer with lowest electrode material loading is furthest away from the polymeric membrane layer.

18. The die of claim 17, wherein the die comprises:

at least three inlet ports and at least three channels respectively configured to receive and transport at least three graded first electrode inks to the merge section; and at least three inlet ports and at least three channels respectively configured to receive and transport at least three graded second electrode inks to the merge section.

19. The die of claim 16, wherein:

the plurality of inlet ports are configured to receive a first metallic ink and a second metallic ink;

the plurality of channels are configured to separately transport the plurality of fluids including the first and second metallic inks from the plurality of inlet ports to the merge section, such that the plurality of fluids flow together in the merge section to form the multilayer extrusion comprising, in order, the first microporous layer, the plurality of graded first electrode layers, a first metallic layer, the polymeric membrane layer, a second metallic layer, the plurality of graded second electrode layers, and the second microporous layer;

the polymeric membrane layer disposed between and in contact with the first and second metallic layers defines a proton exchange membrane (PEM); and the first and second metallic layers are configured to have low hydrogen permeability sufficient to reduce an amount of hydrogen crossover at the polymeric membrane layer relative the PEM devoid of the first and second metallic layers.

20. The die of claim 16, wherein the plurality of channels are spaced apart along a longitudinal axis of the merge section such that the plurality of fluids flow in contact together in the merge section in a specified order to form the multilayer extrusion.

21. An apparatus comprising the die of claim 16, comprising:

a transport mechanism configured to move the substrate into contact with a surface of the multilayer extrusion;

wherein the substrate comprises a first functional component of the electrochemical cell.

22. An apparatus comprising the die of claim 16, comprising:

a first transport mechanism configured to move a first substrate into contact with a first surface of the multilayer extrusion; and a second transport mechanism configured to move a second substrate into contact with a second surface of the multilayer extrusion;

wherein the first substrate comprises a first functional component of the electrochemical cell, and the second substrate comprises a second functional component of the electrochemical cell.

* * * * *